United States Patent [19]

Garfinkle

[11] Patent Number: 4,852,829

[45] Date of Patent: Aug. 1, 1989

[54] UNDERCARRIAGE APPARATUS FOR VERTICAL-LIFT AIRCRAFT

[76] Inventor: Marvin Garfinkle, P.O. Box 15855, Philadelphia, Pa. 19103

[21] Appl. No.: 95,636

[22] Filed: Sep. 14, 1987

[51] Int. Cl.$^4$ .............................................. B64C 25/36
[52] U.S. Cl. ............................ 244/100 R; 244/103 R; 244/17.17; 244/104 R
[58] Field of Search ............ 244/100 R, 103 R, 17.17, 244/102 SL, 104 R, 104 CS

[56] References Cited

FOREIGN PATENT DOCUMENTS

| 16733 | of 1912 | United Kingdom | 244/103 R |
| 194913 | 3/1923 | United Kingdom | 244/103 R |
| 281013 | 11/1927 | United Kingdom | 244/103 R |

Primary Examiner—Galen Barefoot
Assistant Examiner—Rodney Corl

[57] ABSTRACT

Axial motion of the wheel assembly of a flat-spring undercarriage for vertical-lift aircraft is provided to permit proper deflection of the flat spring so as to effectively cushion the touchdown of such an aircraft from a hover.

4 Claims, 2 Drawing Sheets

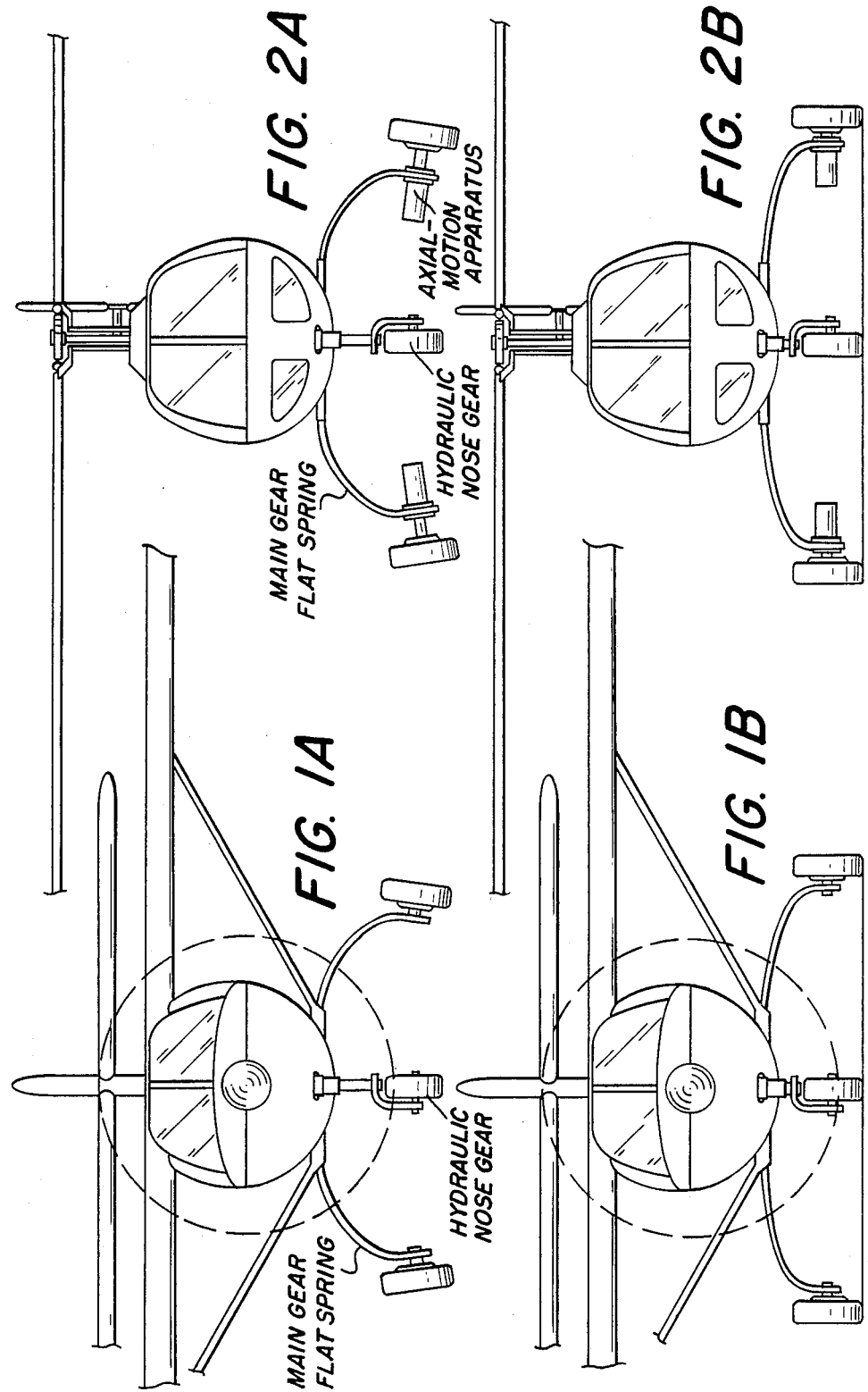

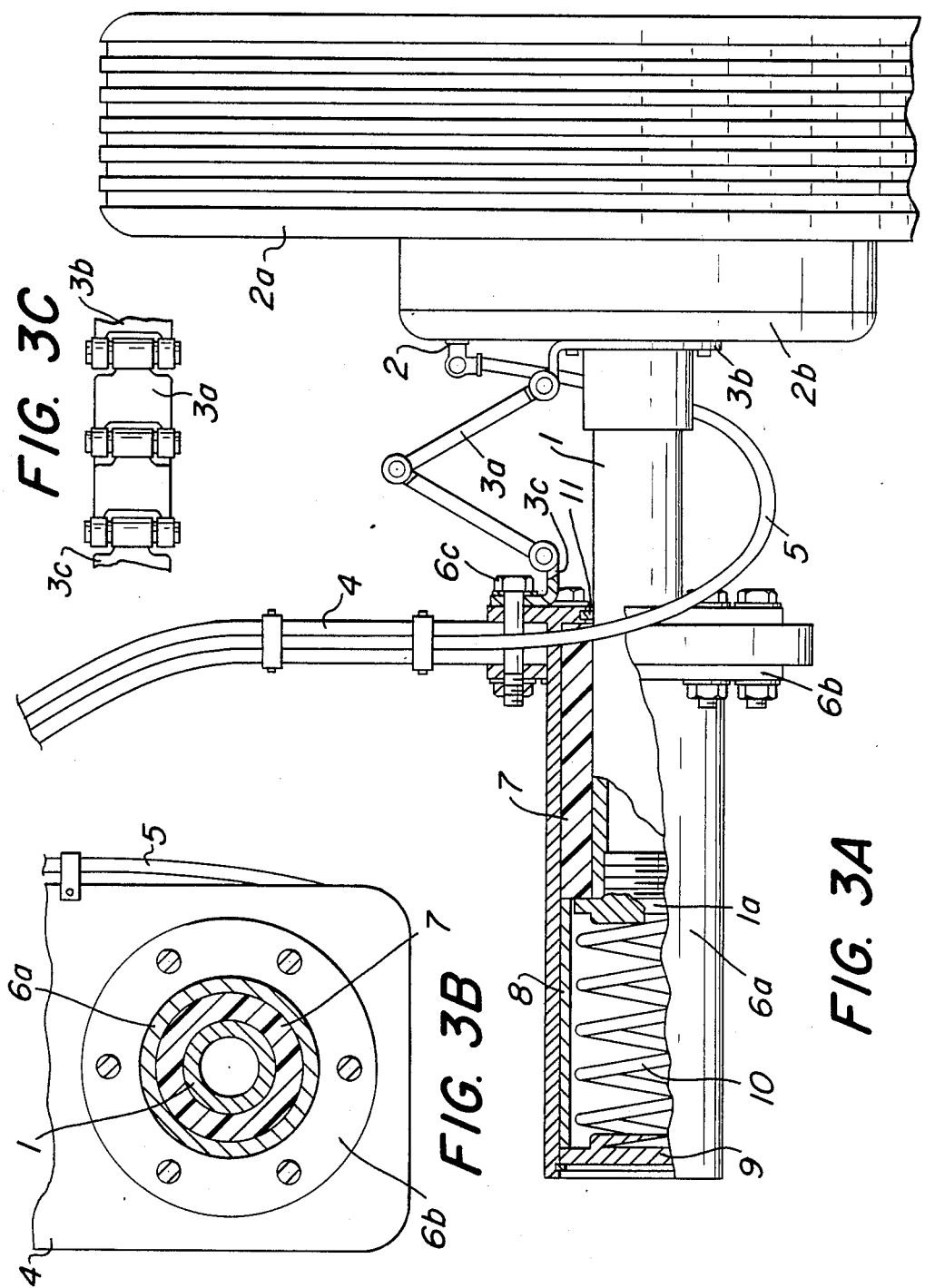

UNDERCARRIAGE APPARATUS FOR VERTICAL-LIFT AIRCRAFT

BACKGROUND OF THE INVENTION

Light general-aviation airplanes can be categorized into high-wing and low-wing monoplane types. Because the wings of the latter type provide a conveniently positioned structure for securing the main undercarriage gear to the aircraft, the same hydraulic shock absorber undercarriage arrangement in conventional use in large commercial aircraft can be adopted. For the popular high-wing types however such a conveniently positioned structure is absent.

For larger high-wing aircraft a short outrigger or sponson is provided to which the main gear is secured and which is often used to hold auxiliary fuel. For light high-wing aircraft such a structural outrigging would add additional weight and complexity. Instead such high-wing aircraft utilize a simple flat-spring undercarriage arrangement.

Accordingly, the single-leaf flat-spring main undercarriage gear has been the mainstay of the light high-wing aircraft industry for perhaps a half century. Originally constructed of spring steel, the considerable weight of the metal spring partially diminished the advantages in simplicity of this undercarriage arrangement over the far more complex hydraulic system. However, the development of light glass-fibre reinforced polymer flat-springs has eliminated this disability.

Helicopters, like high-wing monoplanes, do not have a conveniently positioned structure onto which the main undercarriage gear can be secured. In the case of the larger helicopters, like the larger high-wing aircraft, a sponson is provided. Lighter helicopters use a skid arrangement which provides stability and simplicity, but at the price of considerable inconvenience. Provisions must be made for auxiliary wheels that must be manually installed on the skids for ground handling.

For light helicopter operators who would prefer a wheeled undercarriage, the flat-spring arrangement would appear ideal in terms of both weight and simplicity. However, for the flat-springs to properly absorb the shock of landing, the aircraft must be rolling on contact with the ground to allow the flat-springs to deflect. Because helicopters generally land from a hover with essentially no forward motion, flat-springs can not deflect to absorb the landing load. The objective of the undercarriage apparatus for vertical-lift aircraft disclosed herein is to provide an apparatus to remedy this limitation of the flat-spring undercarriage arrangement.

SUMMARY OF THE INVENTION

FIG. 1A and 1B illustrate a conventional light general-aviation high-wing monoplane in flight and during the landing roll, respectively. At touch down the flat-springs are drooping as shown in FIG. 1A and consequently main gear tires are closer to the aircraft centerline than when the tires are supporting the full weight of the aircraft, as shown in FIG. 1B. In order to cushion the impact of landing the flat-springs must flex upwards, but unless the wheels are free to move laterally, the flat-springs cannot properly deflect.

The static friction between the tire treads and the runway is sufficient to prevent stationary wheels from moving laterally in a direction orthogonally to their rolling direction. However in practice the wheels are rolling, and rolling friction is significantly less than static friction. That is, instead of moving orthogonally to the direction of travel, as the weight of the aircraft is transferred to the wheels, the wheels follow a component of this combined lateral and rolling motion, and gradually move apart to their fully loaded position. Coincidentally, the hydraulic nose gear retracts under the weight of the aircraft. As a result the landing is cushioned.

If a helicopter is substituted for the light airplane, touchdown from a hover will subject the tires to static friction alone. In consequence the wheels will not move laterally and the flat-springs will not flex. As a result the main gear behaves as a rigid member, permitting a hard landing. Moreover, the nose gear will still retract under the weight of the aircraft, resulting in a pronounced nose down aircraft attitude on the ground.

Alternately, if the flat-spring deflection was not constrained by the ground position of the wheels, then the flat-springs could cushion the impact of landing despite the lack of lateral wheel movement. This arrangement is shown in FIGS. 2A and 2B. The axles supporting the wheels have the freedom to move axially. The axles are spring loaded to remain in their extended position as shown in FIG. 2A. Consequenlty, on touch down the wheels are already laterally extended and therefore need not move laterally to permit the flat-springs to flex. Consequently the flat-springs can deflect axially as shown in FIG. 2B, to cushion the landing.

Although the axial freedom provided the wheels does subject the flat-springs to a greater moment at the axle-spring interface than in the case of the conventional flat-spring gear arrangement because the wheels are further offset from the flat-springs, under landing loads the wheels are axially retracted, minimizing the magnitude of this moment.

BRIEF DESCRIPTION OF THE DRAWINGS

FIGS. 1A illustrates the position of the conventional flat-spring undercarriage for a light general aviation airplane in flight.

FIGS. 1B illustrates the position of the conventioanl flat-spring undercarriage for a light general aviation airplane during the landing roll.

FIGS. 2A illustrates the position of the vertical-lift flat-spring undercarriage for a light general aviation helicopter in flight.

FIGS. 2B illustrates the position of the vertical-lift flat-spring undercarriage for a light general aviation helicopter after touch down.

FIG. 3A illustrates a side view of the axial motion apparatus for a vertical-lift flat-spring undercarriage.

FIG. 3B illustrates a cross-section of the axial motion apparatus for a vertical-lift flat-spring undercarriage.

FIG. 3C illustrates the scissor arrangement of the axial motion apparatus for a vertical-lift flat-spring undercarriage.

DESCRIPTION OF THE PREFERRED EMBODIMENT

FIGS. 3A, 3B and 3C illustrate the apparatus that permits the wheel axle rod 1 to move axially under the influence of lateral forces on the conventional wheel assembly 2. The wheel assembly 2 comprises two principal members: the tire 2a, which is free to rotate on axle rod 1, and the hydraulically-actuated brake assembly 2b, which is secured to the axle rod 1. To prevent rotation of the axle rod 1 and brake assembly 2b so that braking can be effected without interfering with the axial motion of axle rod 1, a scissor arrangement 3 is provided, which is secured to the brake assembly 2b by bracket 3b and to the conventional flat spring 4 by bracket 3c. To the edge of flat spring 4 is clipped the flexible hydraulic fluid line 5.

The cylindrical shell 6a, secured to flat-spring 4 by plate 6b and bolts 6c, secures linear bearing 7 through which passes axle rod 1. Axial movement of linear bearing 7 is prevented by spacer tube 8 in contact with shell end-plate 9, secured to shell 6a.

Axle rod 1 is maintained in its extended position by compression spring 10, situated between axle end-plate 1a and shell end-plate 9, until acted upon by a lateral force on wheel assembly 2. To prevent contaminants on axle rod 1 from scoring linear bearing 7, elastomeric scraper ring 11 is provided.

While there have been described what is at present considered to be the preferred embodiment of an undercarriage apparatus for vertical-lift aircraft, it will be obvious to those skilled in the art that various changes and modifications may be made therein without departing from the invention, and it is aimed therefore in the appended claims to cover all such changes and modifications as fall within the true spirit and scope of the invention.

What is claimed is:

1. An undercarriage apparatus for vertical-lift aircraft comprising a spring-loaded device slidably securing the axle rod of the conventional main wheel assembly to the flat-spring of a conventional main flat-spring undercarriage gear, said main wheel assembly comprising a tire and brake assembly;

said spring-loaded device, contained within a cylindrical shell rigidly secured to said flat-spring, providing lateral movement of said flat-spring relative to said wheel assembly in response to axial forces imposed on said wheel assembly by said flat spring during landing of said aircraft from a hover so as to permit proper deflection of said flat-spring to cushion the landing impact of said aircraft.

2. An undercarriage apparatus for vertical-lift aircraft according to claim 1 wherein said spring-loaded device comprises a linear bearing slidably supporting said axle rod, said linear bearing secured within said cylindrical shell;

an axle end plate secured to said axle rod at the opposite end of said axle rod as said wheel assembly so as to slidably secure said axle rod to said linear bearing;

a shell end plate rigidly secured to said cylindrical shell at the opposite end of said flat-spring attachment; and a compression spring positioned between said axle end plate and said shell end plate so as to exert a force on said axle rod to maintain said axle rod extended, and thereby permit proper deflection of said flat-spring by axial movement of said flat-spring relative to said wheel assembly upon landing of said aircraft from a hover so as to cushion said landing impact.

3. An undercarriage apparatus for vertical-lift aircraft according to claim 2 wherein said spring-loaded device is provided with an elastomeric scraper ring secured to said cylindrical shell, said scraper ring in slidable contact with said axle rod so as to protect said linear bearing within said cylindrical shell from contaminants.

4. An undercarriage apparatus for vertical-lift aircraft according to claim 2 wherein a scissor element rotatably secured to a bracket on said flat spring and a bracket on said wheel assembly permits axial motion of said wheel assembly but prevents rotation of said wheel assembly relative to said flat spring so as to permit braking.

* * * * *